G. W. MILLER.
VENDING MACHINE.
APPLICATION FILED MAY 16, 1911.

1,067,669.

Patented July 15, 1913.
6 SHEETS—SHEET 1.

Witnesses:
J. Williams
W. F. Allen

Inventor,
George W. Miller,
by Wells & Williams
Attorneys.

G. W. MILLER.
VENDING MACHINE.
APPLICATION FILED MAY 16, 1911.

1,067,669.

Patented July 15, 1913.
6 SHEETS—SHEET 3.

Witnesses:
T. Williams
W. H. Allen

Inventor,
George W. Miller,
by Wells & Williams
Attorneys.

G. W. MILLER.
VENDING MACHINE.
APPLICATION FILED MAY 16, 1911

1,067,669.

Patented July 15, 1913.
6 SHEETS—SHEET 4.

Witnesses
F. Williams

Inventor,
George W. Miller,
by Wells & Williams
Attorneys.

G. W. MILLER.
VENDING MACHINE.
APPLICATION FILED MAY 16, 1911.

1,067,669.

Patented July 15, 1913.

6 SHEETS—SHEET 5.

Witnesses:
F. Williams
W. F. Allen

Inventor,
George W. Miller
by Wells & Williams
Attorneys.

G. W. MILLER.
VENDING MACHINE.
APPLICATION FILED MAY 16, 1911.

1,067,669.

Patented July 15, 1913.
6 SHEETS—SHEET 6.

Witnesses:
J. Williams

Inventor,
George W. Miller,
by Wells & Williams
Attorneys.

UNITED STATES PATENT OFFICE.

GEORGE W. MILLER, OF LOS ANGELES, CALIFORNIA.

VENDING-MACHINE.

1,067,669.   Specification of Letters Patent.   Patented July 15, 1913.

Application filed May 16, 1911. Serial No. 627,568.

*To all whom it may concern:*

Be it known that I, GEORGE W. MILLER, a citizen of the United States, residing at Los Angeles, in the county of Los Angeles and State of California, have invented a new and useful Vending-Machine, of which the following is a specification.

My object is to produce a vending machine, which will handle delicate packages, and packages which should not be jammed together or handled roughly, or turned bottom upward in delivery; and my invention consists of the novel features herein shown, described and claimed.

Figure 1:
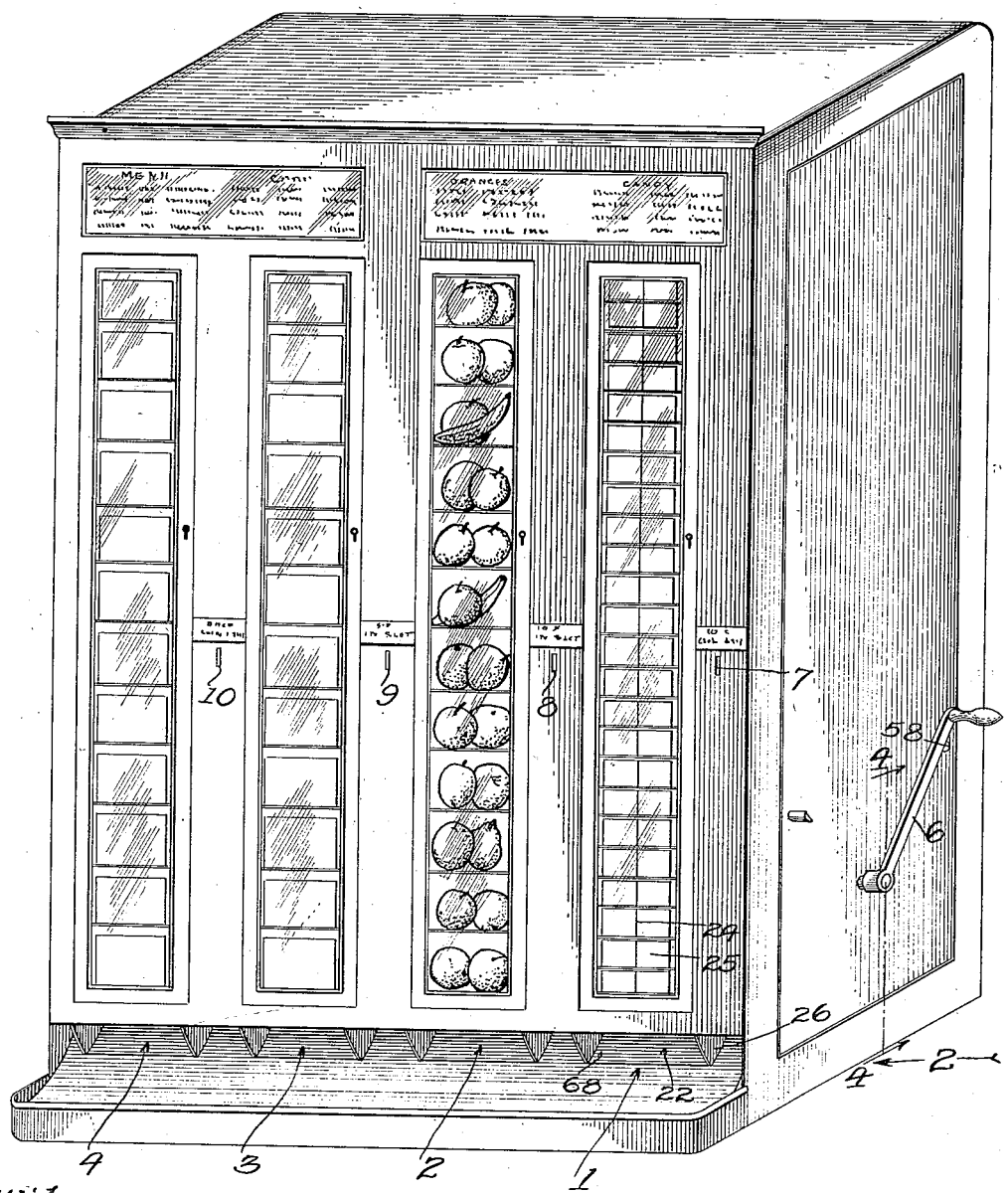
Figure 2:
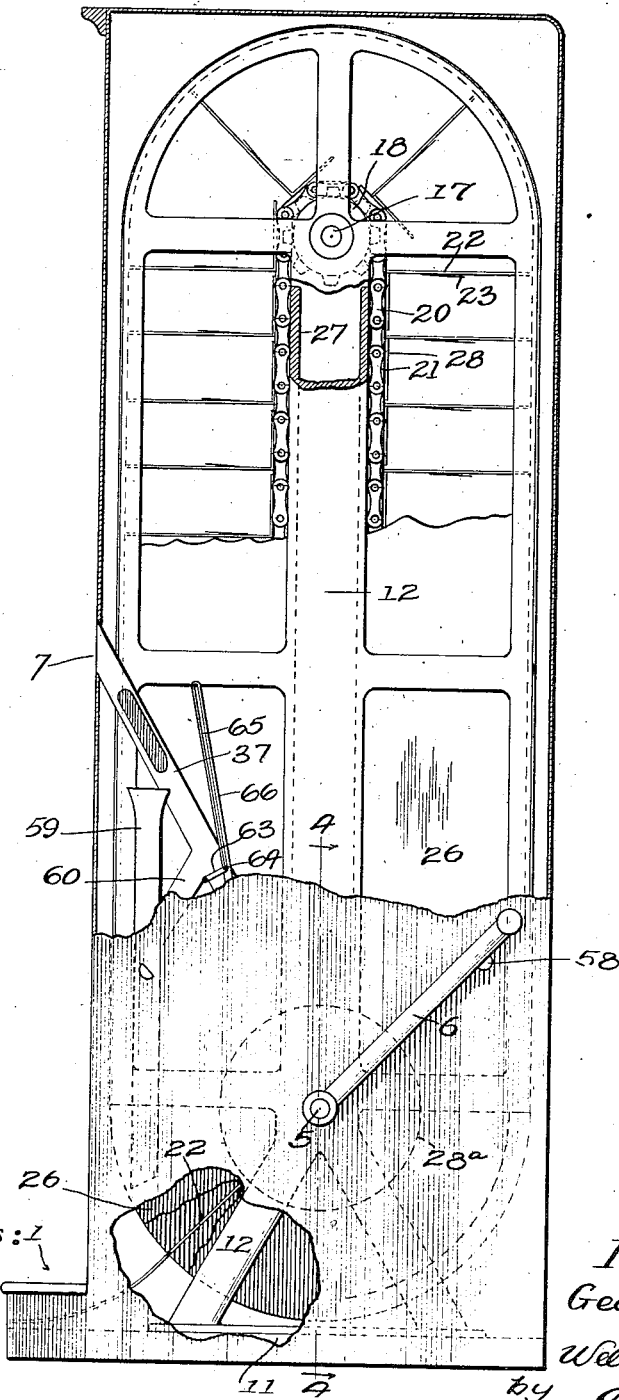
Figure 3:
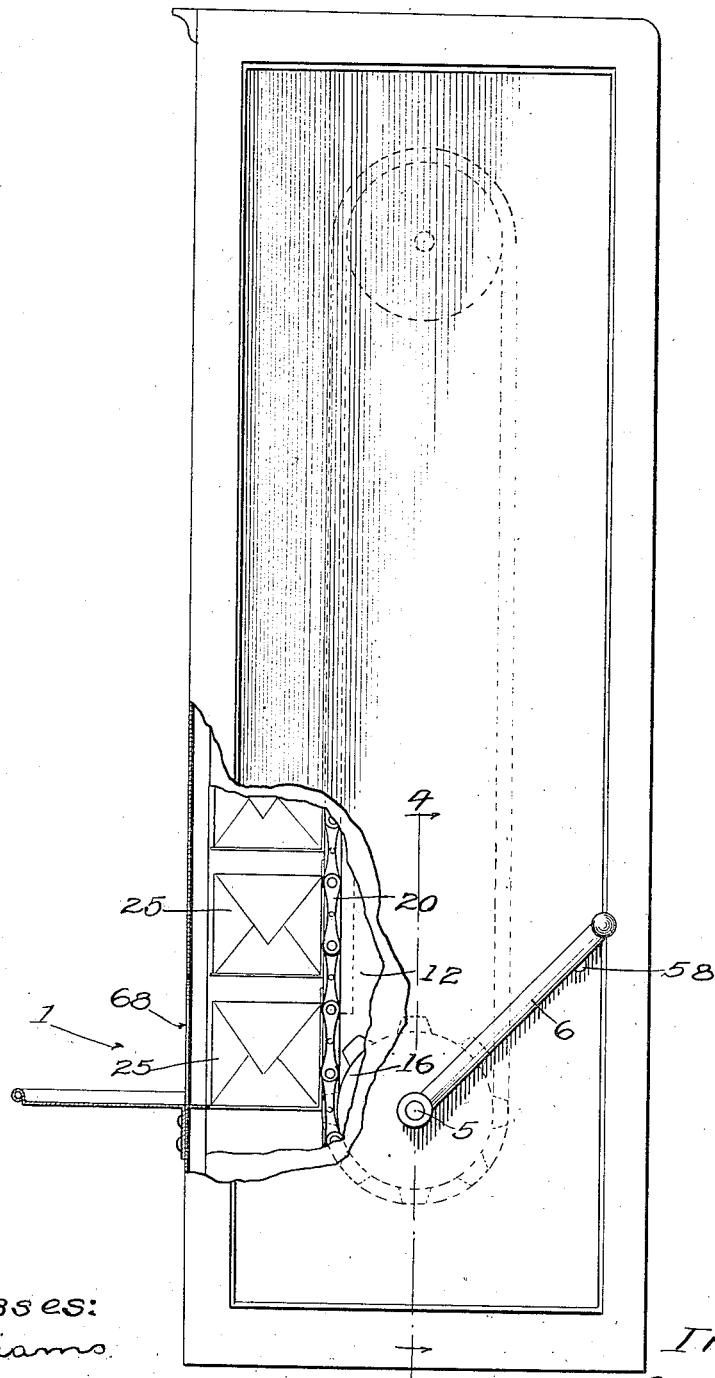
Figure 4:
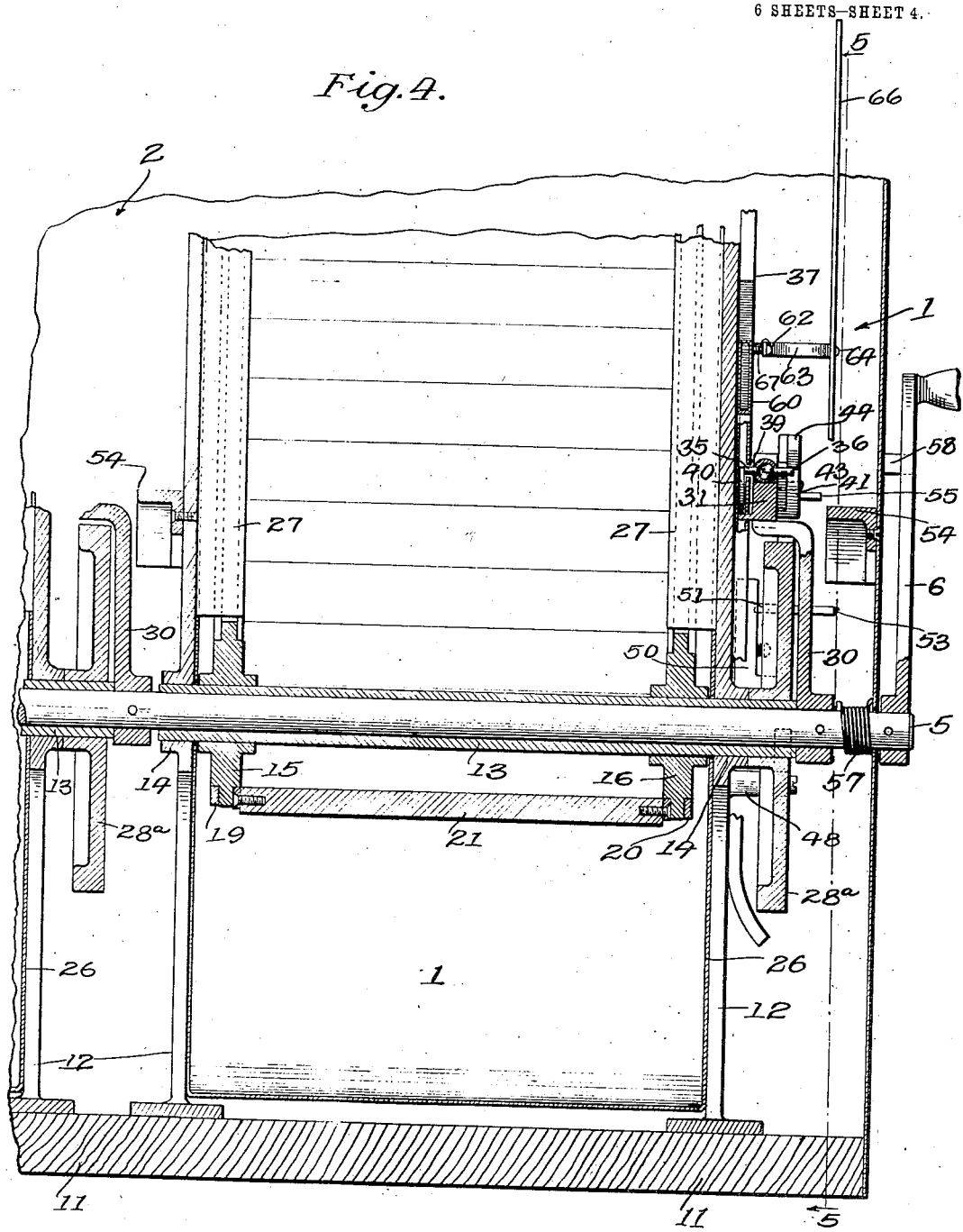
Figure 5:
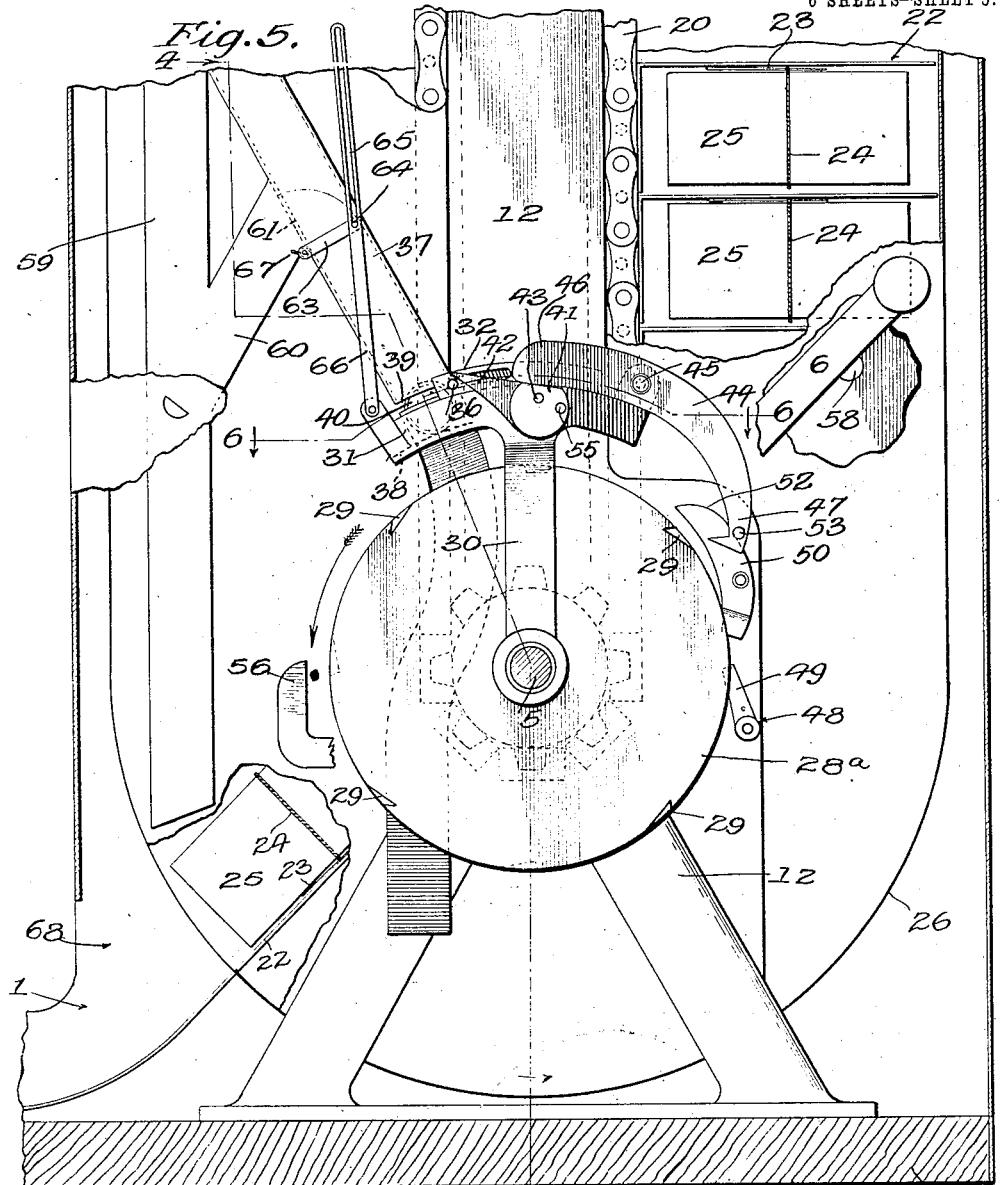
Figure 6:
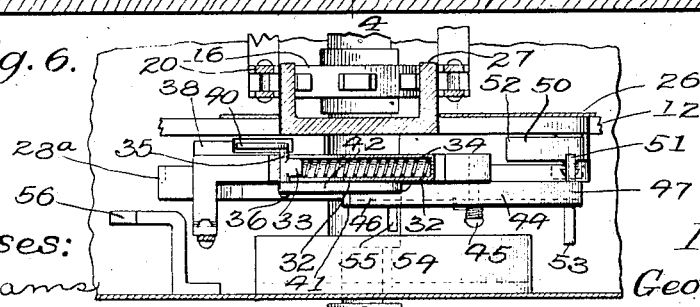
Figure 7:
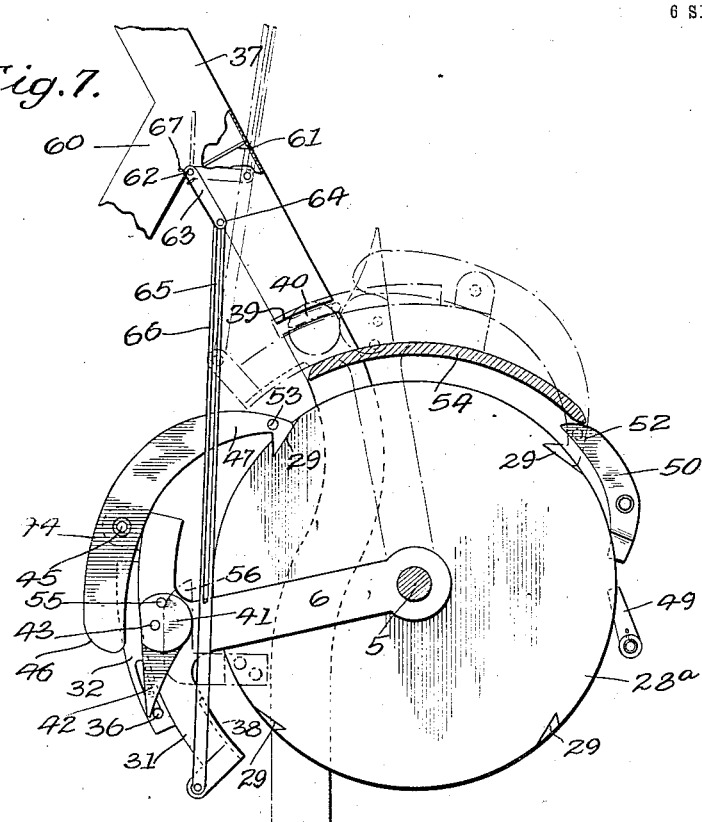
Figure 8:
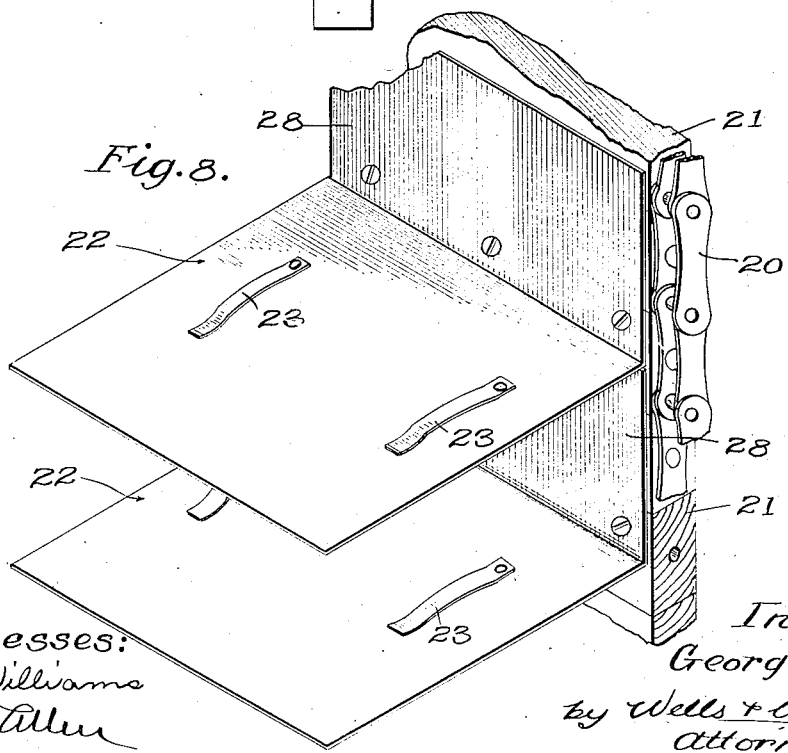

In the drawings:—Figure 1 is a perspective of a vending machine, embodying the principles of my invention. Fig. 2 is an end view as seen looking in the direction indicated by the arrow 2 in the Fig. 1, parts of the casing being broken away to show the frame work. Fig. 3 is a view analogous to Fig. 2 showing a modified form of delivery, the delivery in Fig. 2 discharging downwardly at an angle of about forty-five degrees, and the delivery in Fig. 3 discharging on a horizontal plane. Fig. 4 is a fragmentary vertical longitudinal section on the lines 4—4 of Figs. 1, 2, 3 and 5. Fig. 5 is a fragmentary enlarged cross-section on the line 5—5 of Fig. 4. Fig. 6 is a horizontal sectional detail on the line 6—6 of Fig. 5. Fig. 7 is a view analogous to Fig. 5 showing the parts in operation; the parts being shown at rest in Fig. 5. Fig. 8 is a fragmentary detail perspective showing the construction of the package carriers.

Referring to the drawing in detail, I propose to make a single machine handle any desired number of different kinds of goods. In other words a machine may be made to handle one kind of goods, such as box or package lunches, or boxes of chocolate or candy, or a machine may be made to handle two or more different kinds of goods.

In Fig. 1 I have shown a machine for handling four different kinds of goods, as indicated by the compartments 1, 2, 3 and 4, each compartment being provided with a complete vending mechanism. The operating shaft 5 extends horizontally entirely through the four compartments, and the operating handle 6 serves to deliver from whichever compartment receives the coin, there being a coin slot 7 for the compartment 1, a coin slot 8 for the compartment 2, a coin slot 9 for the compartment 3, and a coin slot 10 for the compartment 4. The coin operated mechanism is essentially the same in each of the compartments, and therefore I have shown only the details of the mechanism in compartment 1.

The base 11 is preferably made of wood, and the supporting frames 12 are secured to the base 11. In the vending machine shown in Fig. 1 there will be four pairs of these supporting frames 12.

Sleeves 13 are mounted upon the operating shaft 5, there being one sleeve for each of the compartments, the shaft turning freely in the sleeves, and the sleeves are mounted in bearings 14 in the frames 12.

Sprocket wheels 15 and 16 are fixed upon the sleeve 13 just inside of the frames 12. The countershaft 17 is mounted in the supporting frames 12 near the top of the machine, parallel with the operating shaft 5, sleeves similar to the sleeves 13 are mounted upon this counter-shaft, and sprocket wheels 18 similar to the wheels 15 and 16 are fixed upon these sleeves in alinement with the sprocket wheels 15 and 16, and sprocket chains 19 and 20 connect the upper and lower sprocket wheels; slats 21 connect the sprocket chains 19 and together. The slats 21 are rectangular in cross section and have flat upper and lower faces contacting with each other when the chains are straight and this construction assists in holding the package carriers upright as it provides a series of members engaging with each other on their adjacent faces so that any strain placed upon one of the members is transmitted to the other members.

The package supports 22 are in the form of shelves which are secured to the slats 21 and extend outwardly. Spring fingers 23 are carried by the package carriers 22 to engage the wrapping string 24 of the package 25, so that the packages are supported by the fingers 23 when they are traveling upwardly, as in the right hand side of Fig. 2. The shelves 22 each preferably consist of a flat sheet of metal having a flange 28 extending at right angles from its inner edge. This flange 28 is wider than the width of a slat to which the flange is attached as shown in Fig. 8, so that this flange extends up and over the greater portion of the next adjacent slat on one side and contacts with the bottom of the next adjacent shelf 22 on one side. The flange thus affords a relatively wide bearing face and further provides a back for the shelf which prevents dust, oil and other foreign matter from passing in between the slats 21 when the slats are turned in passing over the sprocket wheels at the upper and lower ends of the package holders and assists in keeping the article vended in proper condition.

A sheet metal casing plate 26 is mounted between each pair of supporting frames 12 and extends from the front wall to the rear wall of the outer casing, each pair of plates inclosing the package carrier and its contents, said casing being open in front, and there being an opening at the bottom for delivering the package. Oppositely disposed pairs of flanges 27 extend inwardly from each casing plate 26 and embrace the sprocket chains 20 and form guideways for the sprocket chains, so as to hold the sprocket chains of the package carriers from sagging.

Any desired number of package holders 22 may be used in a compartment, but I prefer to make each compartment contain about sixteen packages if loaded on one side, or 30 if loaded on both sides. The packages are entirely inclosed while in the machine, and each package is in a chamber by itself so that it does not become injured by being associated with the other packages, and the package is carried in such a way that very delicate work will not be injured while in the machine, or while it is being discharged. Each compartment is provided with an independent coin controlled mechanism.

A wheel 28ª is fixed upon the sleeve 13, the periphery of said wheel being provided with four ratchet teeth 29, evenly spaced apart. An operating arm 30 is fixed upon the operating shaft 5 beside the wheel 28ª, said arm extending beyond the periphery of the wheel 28ª, and then laterally to a plane inside of the wheel 28ª, and the operating head 31 is carried by this arm 30, said head being a segment of a circle, concentric to the operating shaft 5. A spring casing 32 is carried by the head 31, a plunger 33 is mounted in the spring casing against the spring 34, and a pin 35 extends horizontally from the plunger 33 through a slot in the spring casing to be engaged by the coin, and a pin 36 extends horizontally the other way from the plunger 33 through a slot in the casing to engage and operate a cam. A coin chute 37 extends from the coin slot 7 downwardly to a position just inside of the head 31, and then downwardly to near the bottom of the machine. A ledge 38 extends from the head 31 through a slot in the coin chute, so as to catch and support the coin, and the pin 35 normally stands at rest extending into a slot 39 in the coin chute, so that when a coin 40 rests upon the ledge 38, the pin 35 will engage the edge of the coin. A cam 41 is pivotally mounted beside the head 31 and a cam lever 42 extends from the cam in position to engage the pin 31. A pin 43 serves as a pivot for the cam 41. The pawl is mounted upon the pivot 45 carried by the head 31, the upper end 46 of the pawl engaging the cam 41 and the lower end 47 of the pawl being in position to engage the ratchet teeth 29. A boss 48 extends from the supporting frame 12 and a retaining pawl 49 mounted upon the boss 48 engages the wheel 28ª to hold the wheel from rotating backwardly. The locking pawl 50 is mounted upon the boss 48, and points in the opposite direction from the pawl 49 to lock the machine from rotating forwardly and discharging when there is no coin in the machine. A pin 53 extends from the end 47 of the pawl 44 in position to engage the upper end 52 of the pawl 50, so that when the pawl 44 swings inwardly to take hold of the wheel 28ª, it will throw the pawl 50 out of engagement. When the coin 40 is in position behind the pin 35 and the operating handle 6 is worked, the head 31 will move to the left in Fig. 5; the coin will hold the pin 36 against the cam lever 42 and throw the lever upwardly, thus rotating the cam 41 and raising the end 46 of the pawl 44, thereby swinging the end 47 of the pawl into engagement with the tooth 29, and throwing the pawl 50 out of engagement. As soon as the ledge 38 passes from under the coin, the coin will fall and continued operation of the operating handle 6, will rotate the wheel 28ª, operating the package into position to be discharged. The pin 53 extends from the pawl 44 in position to pass over the guide 54, when there is no coin in the machine, and pass under the guide 54 when there is a coin in the machine. The guide 54 is a segment secured to the casing concentric to the shaft 5, and the object is to hold the pawl 44 in engagement with the tooth 29 after it has once started, so there will be no danger of the operator losing his money by losing the connection. A pin 55 extends from the cam 41 in position to engage the stop 56 after the coin has been discharged, said stop serving to throw the cam back to its normal position. The point of the pawl 44 is adapted to hook under the ratchet tooth 29, so that when the operating lever is being pushed over the pawl will not unhook. A coil spring 57 is mounted upon the shaft 5 to return the operating lever to its normal position against the stop 58, and when the operating lever is in its normal position as in Fig. 4, the coin mechanism is in its normal position as in Fig. 5.

A branch chute 59 extends from the main chute 37, the opening leading to the branch chute, being smaller than the opening through the main chute, so that a thin or narrow coin, or slug will fall through the opening into the branch chute, and be discharged without operating the machine. A second branch chute 60 leads from the main chute 37 to the chute 59 and a trap door 61 is mounted upon the pivot 62 in position to swing one way, and close the main chute 37, and swing the other way and close the branch chute 60. A crank arm 63 is fixed upon the pivot 62 and the crank pin 64 operates in the slot 65 in the link 66, said link being connected to the head 31. The crank arm 63 is set at right angles to the trap door 61, and a spring 67 serves to hold the crank pin 64 downwardly against the end of the slot 65.

When the operating handle is moved to make a discharge, the head 31 moves in the direction indicated by the arrow, that is to the left in Fig. 5, and the link 66 is pulled downwardly, thus allowing the spring 67 to swing the trap door 61 in a position to close the chute 37, so that a coin cannot be inserted and lost during the operation of the machine. If the coin should be inserted while the machine is in operation, it would be discharged through the chute 60, and when the machine returns to its normal position, as in Fig. 5, the link 66 overcomes the tension of the spring 67, and swings the trap door 61 to its normal position, that is in position to close the chute 60, and allows the coin to pass downwardly through the chute 37.

The package carriers consisting each of a pair of sprocket chains, the corresponding slats 21 which are pivoted thereto and the shelves 22, are spaced apart, so that the sprocket chains will move just the right space to deliver the package at each operation of the machine. In Fig. 5 are shown four ratchet teeth 29 upon the wheel 28, and eight teeth upon the sprocket wheel, and each package occupies the space of two links of the sprocket chains. If the size of the package carrier is to be increased or decreased, one simple way is to increase or decrease the diameter of the sprocket wheels and increase or decrease the length of the links. In Figs. 2 and 5, I have shown the delivery at an angle of forty-five degrees; if the package 25 is properly wrapped and the string 24 placed upon the finger 23, the package will slide from the carrier when in the position shown in Fig. 5, and if it does not slide, the operator's hand may be inserted through the discharge opening 68. In Fig. 3 I have shown a horizontal discharge and this form is desirable in vending packages, which must or should remain upright all the time, as for instance a piece of pie, or a box of berries. I desire to call special attention to this feature of my machine; the package carrier may be loaded, each package in a chamber by itself, always right side up if desired, and the delivery or discharge does not in any way injure the most delicate of articles. In handling wrapped packages as in Fig. 5, the entire machine may be loaded, and then of course the packages on the right hand side of the Fig. 5 are bottom upward. When it is desired to use an article which should not be turned bottom upward, the machine is loaded only on the front side. It is particularly pointed out that the packages are entirely separated from each other and inclosed in a chamber formed by the oppositely disposed partition plates 26, the shelf 22, the rear flange 28 thereof, the adjacent shelf 22 and the front or rear wall of the outer casing. It is further pointed out that the flanges 27 extending as they do over the sprocket chains and to the ends of the package holders as shown in Fig. 4 protect the article being vended from any contact with the sprocket chains and from any contamination. This is particularly necessary where food is being vended. Furthermore it is pointed out that the partition plates 26 are spaced from the ends of the shelves 22 so that the shelves do not have frictional contact with these partition plates, though the shelves are inclosed, but that the sprocket chains are nevertheless protected from any contact with the food and inclosed in a separate casing by reason of the inclination of the projecting pairs of flanges 27. Furthermore the plates 26 prevent any portion of the article being nipped between the adjacent faces of the slats 21 when the slats close together after passing around the curved ends of the elliptical path in which the article carrier travels. The shelves 22 are not formed with marginal flanges and particularly are not formed with any marginal flanges on their forward ends. This permits the article to slide from the shelf 22 when the shelf has reached the angle shown in Fig. 5. Prior to that time the resilient fingers 23 engage the twine on the package being vended and hold the package in a proper position, even when the shelf is inverted. If it were not for the rear flanges 28 the paper surrounding these packages would be very liable to be caught between the closing slats 21 when the shelves were passing around the upper end of their curved path as shown in the upper part of Fig. 2.

A suitable housing is built up from the base around the magazine and operating mechanism, and this housing may be provided with a removable front and this front may be provided with glass panels through which the contents of the machine may be seen.

Each of the four compartments is a magazine containing an endless series of package carriers mounted to move up and down, and provided with coin controlled mechanism for moving the package carriers step by step to the delivery opening. It is important that the series of package carriers move up and down, so that in handling and delivering fragile goods the package carriers will remain upright.

It is to be noted that the flanges 27 which extend inward from the side partition plates 26 not only form reinforcing webs for the plates and extend over the sprocket chains as previously described, but that these flanges form guides for the sprocket chains and prevent any sagging of the chains. This is an important point for the reason that if the chains sag, there will be a tendency on the part of the supporting shelves 22 to sag. This tendency is resisted by the flat contacting faces of the members 21 upon which the shelves are supported but it is still further resisted by the flanges 27 which embrace the sprocket chains. By the term "embrace" I include flanges which extend into engagement with the sprocket chains either on the inside or outside.

The details of construction may be varied in many ways without departing from the spirit of my invention.

I claim:—

1. A vending machine including oppositely disposed vertically arranged partition plates, upper and lower rotatable members disposed in the chamber so formed, a pair of oppositely disposed endless connections located in said chamber and passing over said rotatable members, package supports mounted upon the pair of connections and disposed between the partition plates, means for operating the endless connections to move said supports into registry with the delivery opening of the chamber, and spaced flanges extending inward from the partition plates and acting as guides for the endless connections.

2. A vending machine including a casing, an outer casing having a series of delivery openings, a plurality of pairs of transversely extending partition plates dividing said casing into a series of vending chambers, upper and lower rotatable members disposed in each of said chambers, a pair of oppositely disposed endless connections located in each of said chambers and passing over said rotatable members, a plurality of slats pivotally mounted upon said connecting members and disposed between the same, each slat having upper and lower flat engaging faces, a series of outwardly projecting article supports, one mounted upon each slat, means for operating said endless connections to move said supports into register with the delivery opening of the corresponding chamber, and flanges extending inward from each of the partition plates and housing the endless connections.

3. A vending machine including a casing having a delivery opening, upper and lower rotatable members, oppositely disposed endless connections passing over said rotatable members, a plurality of slats disposed between and pivotally mounted on said endless connections, said slats having flat engaging faces, and a series of article supports mounted one upon each slat, each support comprising a plate having an upwardly extending rear flange, said flange being attached to its corresponding slat and extending over the next adjacent slat.

4. A vending machine including an outer casing having a series of delivery openings, a plurality of pairs of transversely extending partition plates dividing said casing into a series of vending chambers, upper and lower rotatable members disposed in each of said chambers, a pair of oppositely disposed endless connections located in each of said chambers and passing over said rotatable members, a plurality of package supports mounted upon each pair of connections and disposed between each pair of partition plates, means for operating said endless connections to move said supports into register with the delivery opening of the corresponding chamber, and spaced flanges extending inward from each of the partition plates and embracing the endless connections.

5. A vending machine including a vending compartment having a front wall and oppositely disposed side walls, endless carriers mounted between said side walls and including parallel oppositely disposed endless flexible connections, and article supports mounted upon said connections, and oppositely disposed pairs of flanges projecting inward from the side walls and embracing the endless connections to house the same.

GEORGE W. MILLER.

Witnesses:
GEORGE BOUQUET,
MARK H. TAYLOR.